United States Patent [19]
Gierow et al.

[11] Patent Number: 5,986,036
[45] Date of Patent: *Nov. 16, 1999

[54] SUBSTRATE MATERIAL FOR HOLOGRAPHIC EMULSIONS UTILIZING FLUORINATED POLYIMIDE FILM

[75] Inventors: Paul A. Gierow; William R. Clayton, both of Huntsville, Ala.; Anne K. St. Clair, Poquoson, Va.

[73] Assignee: The United States of America as represented by the Administrator of the National Aeronautics and Space Administration, Washington, D.C.

[ * ] Notice: This patent is subject to a terminal disclaimer.

[21] Appl. No.: 08/883,851

[22] Filed: Jun. 27, 1997

[51] Int. Cl.⁶ .......................... C08G 73/10; B32B 27/00
[52] U.S. Cl. .......................... 528/170; 528/125; 528/126; 528/128; 528/172; 528/173; 528/174; 528/176; 528/183; 528/185; 528/188; 528/220; 528/229; 528/350; 528/353; 428/458; 428/473.5; 427/58; 427/162; 427/165; 427/168; 385/2

[58] Field of Search ..................... 528/353, 125, 528/174, 126, 128, 170, 172, 173, 176, 183, 185, 188, 220, 229, 350; 428/458, 473.5; 427/58, 162, 165, 168; 385/2

[56] References Cited

U.S. PATENT DOCUMENTS

| | | | |
|---|---|---|---|
| 5,317,082 | 5/1994 | Beuhler et al. | 528/351 |
| 5,338,826 | 8/1994 | St. Clair et al. | 528/353 |

*Primary Examiner*—P. Hampton-Hightower
*Attorney, Agent, or Firm*—Hillary T. Womack

[57] ABSTRACT

A new holographic substrate utilizing flexible, optically transparent fluorinated polyimides. Said substrates have extremely low birefringence which results in a high signal to noise ratio in subsequent holograms. Specific examples of said fluorinated polyimides include 6FDA+APB and 6FDA+4BDAF.

3 Claims, 1 Drawing Sheet

SUBSTRATE MATERIAL FOR HOLOGRAPHIC EMULSIONS UTILIZING FLUORINATED POLYIMIDE FILM

ORIGIN OF THE INVENTION

The invention described herein was jointly made by an employee of the United States Government and by employees of SRS Technologies and may be manufactured and used for the Government for governmental purposes without payment of any royalties thereon or therefor.

TECHNICAL FIELD OF THE INVENTION

This invention pertains generally to the field of materials used as substrates for holographic emulsions. In particular, this invention pertains to the use of fluorinated polyimides as flexible holographic substrates which exhibit extremely low birefringent properties.

BACKGROUND OF THE INVENTION

Typical materials which are used as substrates for holographic emulsions include glass and polyester film material. Glass, an amorphous material, has optical properties which make it an excellent substrate for holography. Glass, however, is costly, fragile, and cannot be used in processes which require a flexible substrate, such as embossed holography.

MYLAR™, Kapton® and other organic film materials are used as flexible substrates for holographic emulsions but they have a birefringent property that changes the polarization of laser light used in making holograms. Such birefringence causes unwanted "noise" in the final hologram.

SUMMARY OF THE INVENTION

The present invention is directed to the development of an optically transparent flexible substrate which exhibits extremely low birefringence, upon which holograms can be fashioned which have high signal to noise ratios. The substrate which has the features of the present invention is comprises an optically transparent, fluorinated polyimide film. These and other features, aspects and advantages of the present invention will become better understood with reference to the following description, drawings and appended claims.

DESCRIPTION OF THE PREFERRED EMBODIMENT

Figure 1:
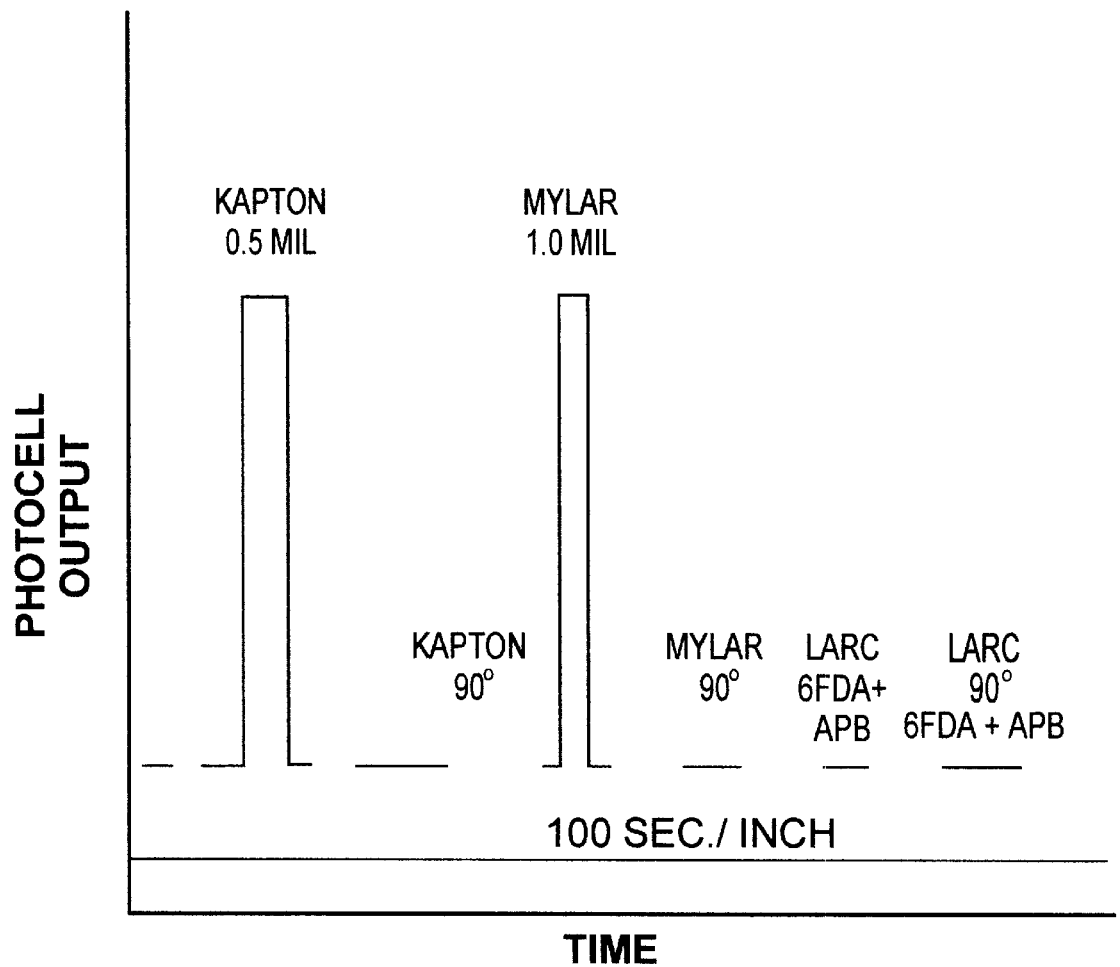
FIG. 1 shows the polarization test response curves demonstrating the low birefringence of 6FDA+APB compared to commercial films.

The chemical structures of the fluorinated, optically transparent polyimides used as example substrates for holograms in the present invention have the formula:

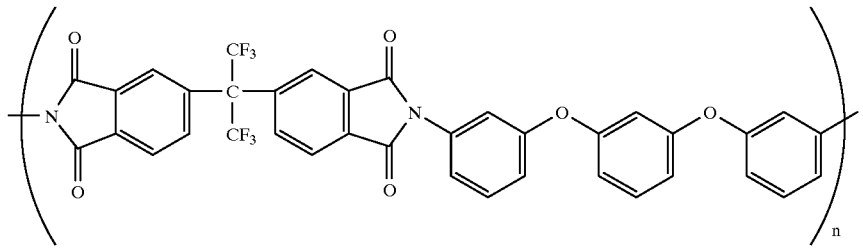

6FDA + APB

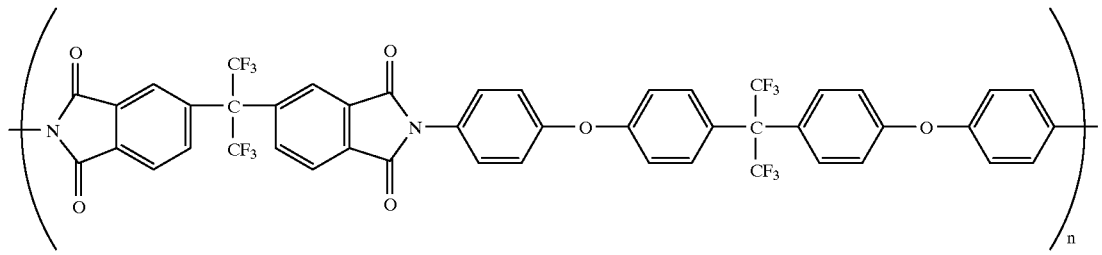

6FDA + 4BDAF

These optically transparent 6FDA+APB and 6FDAA+4BDAF film substrates are fabricated from solutions of the fully imidized polymer dissolved in a solvent which are spin, spray, or doctor blade casted into a film of the solution on a surface. The cast film is then heated at an elevated temperature to drive off the solvent. The films, after heating, are cooled and released from the casting surface. The film thickness has been successfully varied from 0.05 to 2.0 mils. A holographic emulsion comprised of dichromated gelatin, silver halide, or photopolymer is then cast on the 6FDA+APB or the 6FDA+4BDAF film substrate and a hologram is made.

As discussed below, it is not difficult to experimentally demonstrate the superiority of optically transparent fluorinated polyimides over prior art.

EXAMPLE 1

A test apparatus was assembled to demonstrate the "low" birefringence of the 6FDA+APB polyimide. The test apparatus included a polarized HeNe laser, film holder, polarizing filter, target and photocell. The polarizer was rotated until no laser light was transmitted through to the target. Film samples were placed in the film holder. When the 6FDA+APB polyimide film was placed in the film holder, no change in the photocell output was recorded. The response curve shown in FIG. 1 demonstrates the low birefringence of the optically transparent 6FDA+APB polyimide film as compared to commercially available MYLAR™, and Kapton® film.

EXAMPLE 2

A Metricon Laser Prism Coupler model 2010 was used to obtain the in-plane refractive index and out of plane refractive index of two embodiments of the present invention to again demonstrate their superiority over the prior art in terms of birefringence. The birefringence was taken to be the difference between the two refractive indices. The data was then obtained and compared to that of Kapton® film, a commercially available, optically transparent organic film material.

| Material | n (in plane) | n (out of plane) | birefringence |
|---|---|---|---|
| 6FDA + APB | 1.609 | 1.601 | .008 |
| 6FDA + 4BDAF | 1.557 | 1.569 | .012 |
| Kapton ® film | 1.739 | 1.628 | .111 |

This data shows that commercial polyimide film has a high degree of in-plane ordering which would lead to inefficiency as a hologram substrate. The present invention, however, displays an extremely low degree of birefringence and therefore serves as an excellent substrate for holographic emulsions.

Although the present invention has been described in considerable detail with reference to certain preferred versions thereof, other versions are possible. For example, other optically transparent fluorinated polyimides could foreseeably be used as hologram substrates. Therefore, the spirit and the scope of the appended claims should not be limited to the description of the preferred versions contained herein.

What is claimed is:

1. A flexible, optically transparent holographic substrate material which possesses a birefringence value not to exceed about 0.01, wherein said material comprises a fluorinated polyimide.

2. A substrate material, according to claim 1, comprising a fluorinated polyimide selected from the group consisting of 6FDA+APB and 6FDA+4BDAF.

3. The substrate claimed in claim 1 wherein the film thickness is varied from 0.05 to 2.0 mils.

* * * * *